US005488195A

United States Patent [19]

Mickel

[11] Patent Number: 5,488,195

[45] Date of Patent: Jan. 30, 1996

[54] AUTOMATICALLY ACTUATED SOUND APPARATUS

[76] Inventor: Thattil J. Mickel, Thattil House, P.O. Valapad, Trichur Kerala, Ind., 680 567

[21] Appl. No.: 199,009

[22] Filed: Feb. 18, 1994

[51] Int. Cl.[6] .................. G06F 7/04; G10H 1/26

[52] U.S. Cl. .................. 84/609; 340/825.31; 340/825.34

[58] Field of Search .................. 84/600–602, 609–614; 340/825.3, 825.31, 825.32, 825.33, 825.34, 825.35; 307/9.1, 10.1–10.8; 318/480

[56] References Cited

U.S. PATENT DOCUMENTS

| | | | |
|---|---|---|---|
| D. 299,905 | 2/1989 | Fish et al. . | |
| 4,110,750 | 8/1978 | Heyning et al. | 84/609 X |
| 4,326,276 | 4/1982 | Scott, Jr. | 84/609 X |
| 4,438,426 | 3/1984 | Adkins . | |
| 4,893,852 | 1/1990 | Harris et al. . | |
| 4,905,559 | 3/1990 | Viviani | 84/609 |
| 5,019,812 | 5/1991 | Göstahagberg et al. . | |
| 5,029,912 | 7/1991 | Gotanda . | |
| 5,191,268 | 3/1993 | Duhame | 318/480 X |
| 5,296,641 | 3/1994 | Stelzel | 84/602 |
| 5,382,948 | 1/1995 | Richmond | 340/825.31 X |

*Primary Examiner*—Stanley J. Witkowski

[57] ABSTRACT

A new and improved automatically actuated music apparatus includes an infrared wave transmitter unit mounted on a door and also includes a music generating unit placed in a room which automatically receives infrared waves transmitted from the door-mounted wave transmitter unit when the door is opened. The door-mounted wave transmitter unit transmits waves in a predetermined wave pattern as the door is opened, and the wave receiver assembly of the music generating unit is positioned in the room so that the wave receiver assembly automatically receives activating wave energy from the door-mounted wave transmitter unit when the door is opened. The door-mounted wave transmitter unit is switched on when a door lock assembly is unlocked in an authorized manner, such as by a key. The door lock assembly is mounted on the door, and a transmitter actuator assembly, attached to a portion of the door lock assembly, actuates the door-mounted wave transmitter unit. The door lock assembly may be mounted in a first housing portion. The door-mounted wave transmitter unit is mounted in a second housing portion. The transmitter actuator assembly projects from the first housing portion through a slot into the second housing portion for actuating the door-mounted wave transmitter unit. The transmitter actuator assembly is operated by a spring bolt in the door lock assembly.

11 Claims, 4 Drawing Sheets

AUTOMATICALLY ACTUATED SOUND APPARATUS

BACKGROUND OF THE INVENTION

1. Field of the Invention

The present invention relates generally to electronic devices which produce music, and more particularly, to a device for automatically producing music upon the occurrence of an activating event.

2. Description of the Prior Art

It is well known to use various activating events for automatically starting electronic devices. Many of these devices are security devices that are automatically actuated upon the occurrence of an event. Many of these devices are associated with a door lock. For example, the following U.S. patents disclose electronic security devices associated with door locks: 4,438,426; 4,893,852; 5,019,812; 5,029,912; and Des. 299,905.

Generally, security devices operate in the following manner. When an unauthorized act takes place, an alarm device is automatically actuated. When an authorized act takes place, no alarm is actuated.

However, a person may wish certain acts to take place automatically upon an authorized entry through a door. More specifically, a person may want a light to be lit automatically when a door opens during an authorized entry. In addition, a person may want music to begin when a door opens during an authorized entry. In this respect, it would be desirable if a device were provided which automatically activates a desired occurrence when a door is opened during an authorized entry.

One specific kind act that may be desirable to take place upon the occurrence of an authorized entry through a door is the playing of music. In this respect, it would be desirable if a device were provided which automatically begins the playing of music when a door is opened during an authorized entry.

As disclosed in U.S. Pat. No. 4,893,852, different forms of wave energy are conventionally used in security systems. However, it would be desirable, instead, to employ wave energy to initiate a specific kind of act upon the occurrence of an authorized entry through a door.

When a door is equipped with a security system, in order to prevent the occurrence of an alarm during an authorized entry through the door, a series of steps must be often be taken by an authorized entrant in order to prevent the sounding of an alarm. Often, the authorized entrant must enter a security code to prevent the occurrence of the alarm. Codes are often complex and may be easily forgotten. Yet they may be necessary to prevent an unauthorized person from randomly discovering them. Yet, when the problem of unauthorized entry is not a problem to be reckoned with, it would be desirable to be able to prevent the automatic occurrence of an event that would occur upon an authorized entry. In this respect, it would be desirable if a device were provided which permits the prevention of an automatic occurrence of an event when a door is opened in an authorized manner without using coded information.

When a person first opens a door to enter a dwelling, such as a house or an apartment, the person may like to hear a musical sound emanating from the interior of the dwelling. This means that the act of opening the door should remotely actuate a music generator in the interior of the dwelling.

Remote communication between one location by another is carried out by either a hard wire link or a wave energy link. A hard wire link takes up space, may be tripped over, and may fatigue and break with continuous and repetitive use. In this respect, it would be desirable if a device were provided which avoids the use of a hard wire connection between the door and the music generator.

A wave transmitter can communicate with a wave receiver without using a hard wire link. Such wave communications are used for communicating over large distances, such as by radio and television stations; and they are also used over short distances, such as for remote controls of televisions and video cassette recorders. In addition, wave communications may be employed between input/output devices and central processing units in computer systems. Because of the advantages of a wave energy link, it would be desirable if communication between a door of a dwelling and a music generator in the interior of the dwelling be effectuated by a wave energy link.

When a door to a dwelling is opened, a two-step procedure generally is carried out. First, a door lock is unlocked; and second, the unlocked door is swung open. To simplify operation of a wave energy link between a door and a music generator, it would be desirable if a wave transmitter were automatically turned on when the door lock were unlocked. In addition, to simplify operation, it would be desirable if the music generator were turned on automatically when the unlocked door were swung open.

Thus, while the foregoing body of prior art indicates it to be well known to use alarms actuated by unauthorized entry through a door, the prior art described above does not teach or suggest an automatically actuated music apparatus which has the following combination of desirable features: (1) automatically activates a desired occurrence when a door is opened during an authorized entry; (2) automatically begins the playing of music when a door is opened during an authorized entry; (3) employs wave energy to initiate a specific kind of act upon the occurrence of an authorized entry through a door; (4) permits the prevention of an automatic occurrence of an event when a door is opened in an authorized manner without using coded information; (5) remotely actuates a music generator in the interior of the dwelling when a door to the dwelling is opened; (6) avoids the use of a hard wire connection between the door and the music generator; (7) uses a wave energy link to effectuate communication between a door of a dwelling and a music generator in the interior of the dwelling; (8) automatically turns on a wave transmitter when the door lock is unlocked; and (9) automatically turns on the music generator when the unlocked door is swung open. The foregoing desired characteristics are provided by the unique automatically actuated music apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved automatically actuated sound apparatus which includes a wave transmitter unit mounted on a door and also includes a sound generating unit placed in a room which automatically receives waves transmitted from the door-mounted wave transmitter unit when the door is opened. The sound generating unit includes a wave receiver assembly for receiving wave energy from the door-mounted wave transmitter unit and a sound generating assembly which is activated by the wave receiver assembly. Preferably, the sound generated by the sound generating unit is music.

The door-mounted wave transmitter unit preferably transmits infrared waves, and the sound generating unit is activated upon receipt of activating infrared waves. The activating infrared waves may be automatically generated in a coded manner from the door-mounted wave transmitter unit, and the activating infrared waves are automatically decoded in the sound generating unit. A decoder assembly may be connected between the wave receiver assembly and the sound generating assembly for automatically decoding coded infrared signals. The door-mounted wave transmitter unit transmits waves in a predetermined wave pattern as the door is opened, and the wave receiver assembly of the sound generating unit is positioned in the room so that the wave receiver assembly automatically receives activating wave energy from the door-mounted wave transmitter unit when the door is opened.

The door-mounted wave transmitter unit includes a battery power source, an infrared frequency generating assembly powered by the battery power source, and an infrared wave generating assembly driven by the infrared frequency generating assembly. An indicator light assembly, powered by the battery power source, indicates when the door-mounted wave transmitter unit is activated. The door-mounted wave transmitter unit is switched on when a door lock assembly is unlocked. The door lock assembly is mounted on the door, and a transmitter actuator assembly, attached to a portion of the door lock assembly, actuates the door-mounted wave transmitter unit.

The door lock assembly may be mounted in a first housing portion. The door-mounted wave transmitter unit is mounted in a second housing portion. A slot is provided between the first housing portion and the second housing portion. The transmitter actuator assembly projects from the first housing portion through the slot into the second housing portion for actuating the door-mounted wave transmitter unit.

The transmitter actuator assembly is operated by a spring bolt in the door lock assembly. The first housing portion and the second housing portion are formed as a unitary integrated housing structure.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved automatically actuated music apparatus which has all of the advantages of the prior art and none of the disadvantages.

It is another object of the present invention to provide a new and improved automatically actuated music apparatus which may be easily and efficiently manufactured and marketed.

It is a further object of the present invention to provide a new and improved automatically actuated music apparatus which is of durable and reliable construction.

An even further object of the present invention is to provide a new and improved automatically actuated music apparatus which is susceptible of a low cost of manufacture with regard to both materials and labor, and which accordingly is then susceptible of low prices of sale to the consuming public, thereby making such automatically actuated music apparatus available to the buying public.

Still yet a further object of the present invention is to provide a new and improved automatically actuated apparatus which automatically activates a desired occurrence when a door is opened during an authorized entry.

Still another object of the present invention is to provide a new and improved automatically actuated music apparatus that automatically begins the playing of music when a door is opened during an authorized entry.

Yet another object of the present invention is to provide a new and improved automatically actuated music apparatus which employs wave energy to initiate a specific kind of act upon the occurrence of an authorized entry through a door.

Even another object of the present invention is to provide a new and improved automatically actuated music apparatus that permits the prevention of an automatic occurrence of an event when a door is opened in an authorized manner without using coded information.

Still a further object of the present invention is to provide a new and improved automatically actuated music apparatus which remotely actuates a music generator in the interior of the dwelling when a door to the dwelling is opened.

An even further object of the present invention is to provide a new and improved automatically actuated music apparatus that avoids the use of a hard wire connection between the door and the music generator.

Still another object of the present invention is to provide a new and improved automatically actuated music apparatus which uses a wave energy link to effectuate communication between a door of a dwelling and a music generator in the interior of the dwelling.

Yet another object of the present invention is to provide a new and improved automatically actuated music apparatus that automatically turns on a wave transmitter when the door lock is unlocked.

Still a further object of the present invention is to provide a new and improved automatically actuated music apparatus that automatically turns on the music generator when the unlocked door is swung open.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

Figure 1:
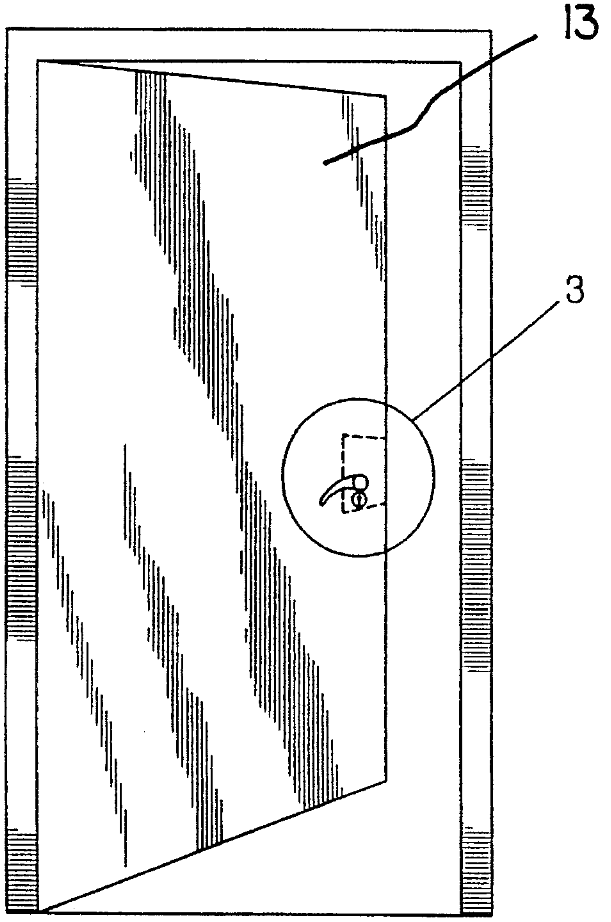
FIG. 1 is a perspective view showing a combined wave transmitter and door lock of the automatically actuated music apparatus of the invention installed on a dwelling door.
Figure 2:
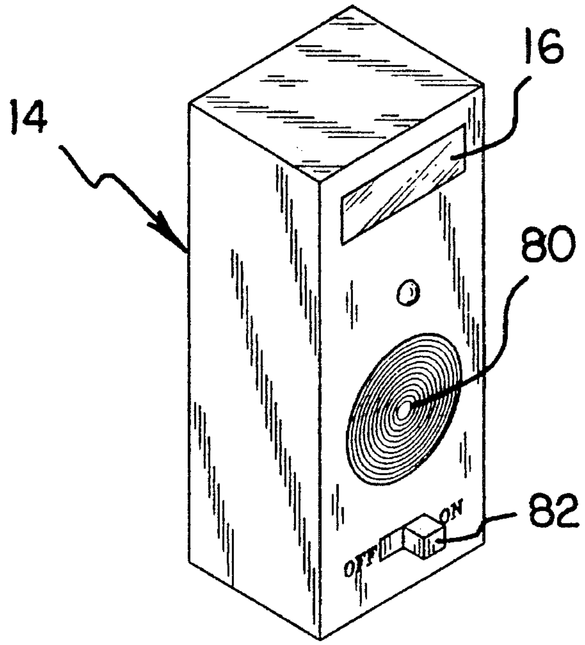
FIG. 2 is a perspective view of a music generator assembly which receives activating waves from the wave transmitter of the embodiment of the invention shown in FIG. 1 and generates music upon receipt of those activating waves.
Figure 3:
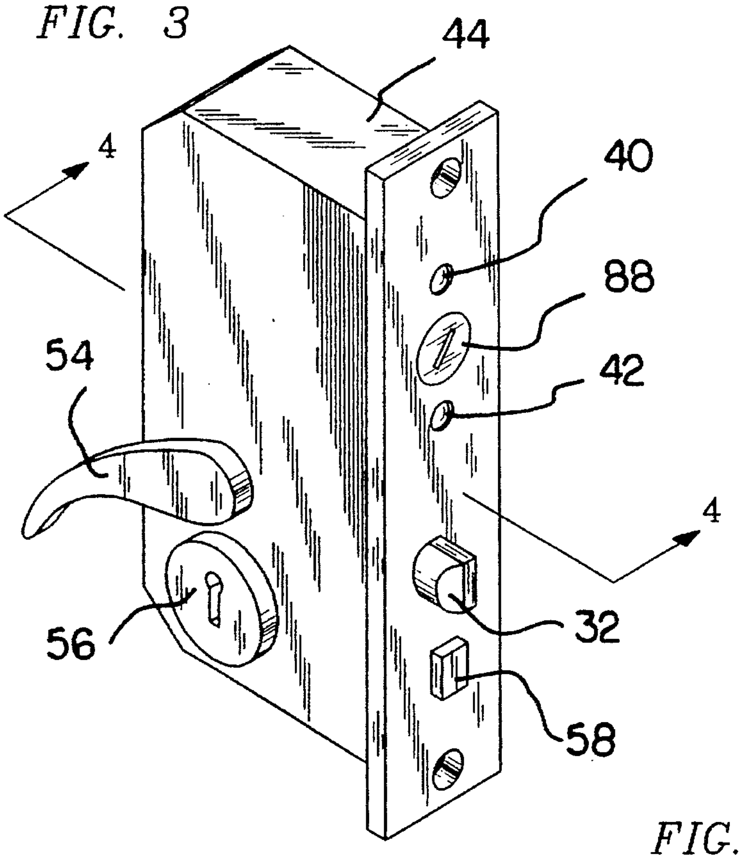
FIG. 3 is an enlarged perspective view of the combined wave transmitter and door lock of the invention shown in the circled region 3 of FIG. 1.

With reference to the drawings, a new and improved automatically actuated music apparatus embodying the principles and concepts of the present invention will be described.

Turning initially to FIGS. 1–4, there is shown a preferred embodiment of the automatically actuated music apparatus of the invention. In its preferred form, the automatically actuated music apparatus includes a wave transmitter unit 12 mounted on door 13 and also includes a sound generating unit 14 placed in a room which receives waves transmitted from the door-mounted wave transmitter unit 12 when the door is opened. The sound generating unit 14 includes a wave receiver assembly 16 for receiving wave energy from the door-mounted wave transmitter unit 12 and a sound generating assembly 18 which is activated by the wave receiver assembly 16. The wave receiver assembly 16 includes a photosensitive assembly 62 (shown as chip U2GP1U52X) and an amplifier 64 (shown as NPN transistor Q12N3904). The sound generating unit 14 is powered by a 9 V battery 66. Preferably, the sound generated by the sound generating unit 14 is music.

The door-mounted wave transmitter unit 12 preferably transmits infrared waves, and the sound generating unit 14 is activated upon receipt of activating infrared waves. As shown in greatest detail in FIG. 5, the activating infrared waves are automatically generated in a coded manner from the door-mounted wave transmitter unit 12, and, as shown in greatest detail in FIG. 6, the activating infrared waves are automatically decoded in the sound generating unit 14.

Figure 6:
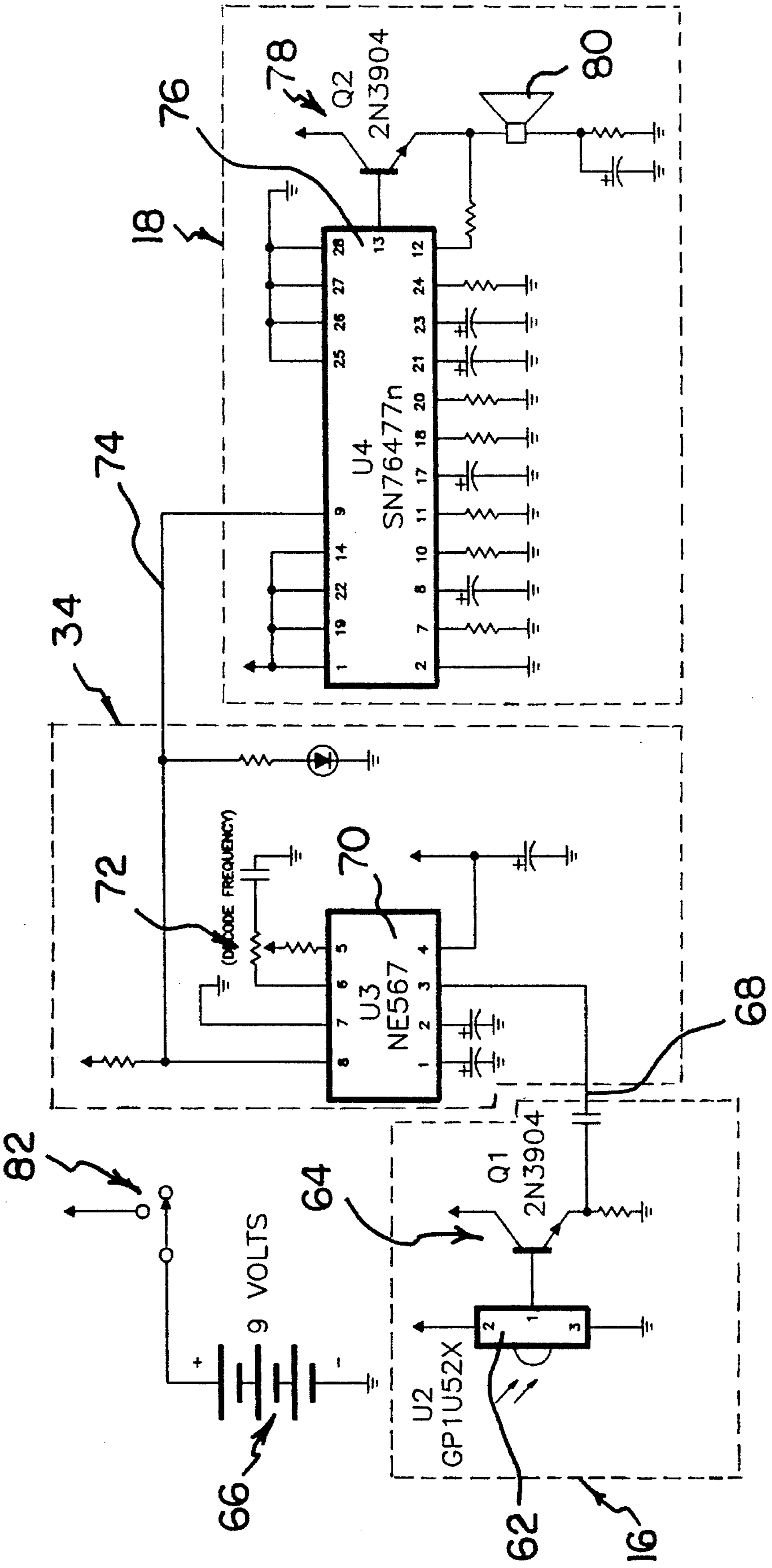
FIG. 6 is an electrical schematic diagram of a music generator assembly which receives activating waves from the wave transmitter and generates music upon activation.

More specifically, as shown in FIG. 6, signals from the amplifier 64 are fed on line 68 into the decoder assembly 34 which includes decoding chip U3NE567 shown as element 70. Decode frequency is adjustable by varying the resistance of the variable resistor 72. The decoded signal from the chip U3NE567 is fed on line 74 to music chip 76 (which is U4SN76477n). The signal from the music chip 76 is amplified by transistor 78 (Q22N3904) which drives speaker 80 from which the musical sounds emerge.

An on/off switch 82 is provided to optionally prevent the production of music when the door 13 is opened. For example, a user may plan to return home at a very late hour and not want to be welcomed by music. In this case, before the person left home, the on/off switch 82 would be switched to the off position. Otherwise, when music is desired to be played automatically when the door is opened, the on/off switch 82 would be switched to the on position. decoder assembly 34 is connected between the wave receiver assembly 16 and the sound generating assembly 18 for automatically decoding coded infrared signals. The door-mounted wave transmitter unit 12 transmits waves in a predetermined wave pattern as the door 13 is opened, and the wave receiver assembly 16 of the sound generating unit 14 is positioned in the room so that the wave receiver assembly 16 receives activating wave energy from the door-mounted wave transmitter unit 12 when the door 13 is opened.

Figure 5:
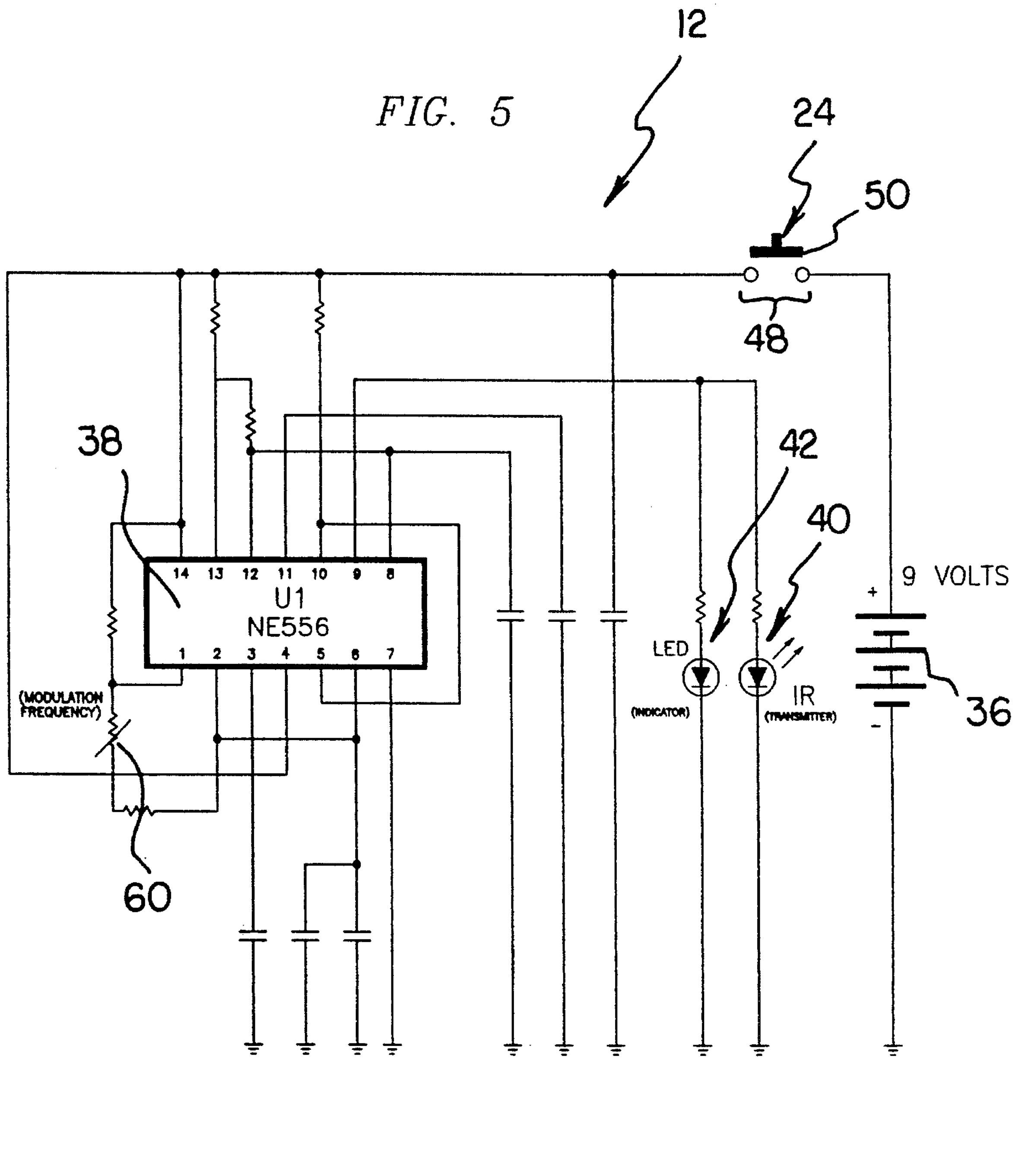
FIG. 5 is an electrical schematic diagram of an infrared wave transmitter used with the invention.

As shown in FIG. 5, the door-mounted wave transmitter unit 12 includes a battery power source 36. An infrared frequency generating assembly 38, shown as electronic chip U1NE556, powered by the battery power source 36, and an infrared wave generating assembly 40, shown as an infrared (IR) emitting LED 40, driven by the infrared frequency generating assembly 38. The frequency of the infrared wave generation can be altered by adjusting the resistance in variable resistance resistor 60. The battery power source 36 is housed in a battery housing 86 and is retained in the battery housing 86 by a screw cap 88.

An indicator light assembly 42, powered by the battery power source 36, indicates when the door-mounted wave transmitter unit 12 is activated. The indicator light assembly 42 is shown as an LED 42. The door-mounted wave transmitter unit 12 is switched on when a door lock assembly 22 is unlocked. The door lock assembly 22 is mounted on the door 13, and a transmitter actuator assembly 24, attached to a portion of the door lock assembly 22, actuates the door-mounted wave transmitter unit 12.

Figure 4:
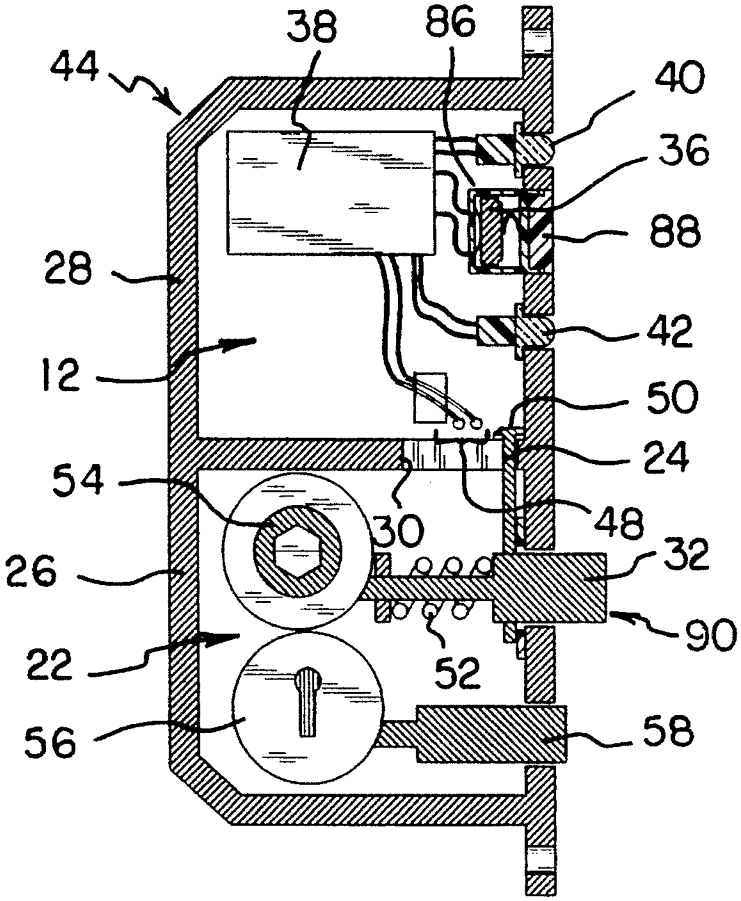
FIG. 4 is an enlarged cross-sectional view of the combined wave transmitter and door lock of the invention shown in FIG. 3 taken along line 4—4 of FIG. 3.

As shown in FIG. 4, the door lock assembly 22 is mounted in a first housing portion 26. The door-mounted wave transmitter unit 12 is mounted in a second housing portion 28. A slot 30 is provided between the first housing portion 26 and the second housing portion 28. The transmitter actuator assembly 24 projects from the first housing portion 26 through the slot 30 into the second housing portion 28 for actuating the door-mounted wave transmitter unit 12.

As shown in greatest detail in FIG. 5, the door-mounted wave transmitter unit 12 includes a switch assembly 48 that is closed by a conductive portion 50 of the transmitter actuator assembly 24 when the door lock assembly 22 is opened. The door lock assembly 22 also includes a spring 52 for biasing the spring bolt 32. A handle 54 is used to retract the spring bolt 32 against the bias of the spring 52.

As shown in FIG. 4, the position of the transmitter actuator assembly 24 and the conductive portion 50 thereof is in a non-contacting position because the spring bolt 32 is in the locked position. However, when the spring bolt 32 is moved in the direction of arrow 90, that is when the handle 54 is pressed down to open the door 13 and pull the spring bolt 32 in the direction of the arrow 90, the conductive portion 50 of the transmitter actuator assembly 24 moves into contact with the switch assembly 48, causing the infrared frequency generating assembly 38 to be activated, thereby causing the infrared wave generating assembly 40 to generate its infrared waves. As stated above, the transmitter actuator assembly 24 is operated by a spring bolt 32 in the door lock assembly 22. The door lock assembly 22 also includes a key-locked portion 56 which controls operation of a deadbolt 58. The first housing portion 26 and the second housing portion 28 are formed as a unitary integrated housing structure 44.

The components of the automatically actuated music apparatus of the invention can be made from inexpensive and durable electronic components.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved automatically actuated music apparatus that is low in cost, relatively simple in design and operation, and which may advantageously be used to automatically activate a desired occurrence when a door is opened during an authorized entry. With the invention, an automatically actuated music apparatus is provided which automatically begins the playing of music when a door is opened during an authorized entry. With the invention, an automatically actuated music apparatus is provided which employs wave energy to initiate a specific kind of act upon the occurrence of an authorized entry through a door. With the invention, an automatically actuated music apparatus is provided which permits the prevention of an automatic occurrence of an event when a door is opened in an authorized manner without using coded information. With the invention, an automatically actuated music apparatus is provided which remotely actuates a music generator in the interior of the dwelling when a door to the dwelling is opened. With the invention, an automatically actuated music apparatus is provided which avoids the use of a hard wire connection between the door and the music generator. With the invention, an automatically actuated music apparatus is provided which uses a wave energy link to effectuate communication between a door of a dwelling and a music generator in the interior of the dwelling. With the invention, an automatically actuated music apparatus is provided which automatically turns on a wave transmitter when the door lock is unlocked. With the invention, an automatically actuated music apparatus is provided which automatically turns on the music generator when the unlocked door is swung open.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by LETTERS PATENT of the U.S. is as follows:

1. A new and improved automatically actuated sound apparatus, comprising:

a wave transmitter unit mounted on a door, a sound generating unit which includes a wave receiver assembly for receiving wave energy from said door-mounted wave transmitter unit and a sound generating assembly which is activated by said wave receiver assembly, a door lock assembly mounted on the door, and a transmitter actuator assembly, attached to a portion of said door lock assembly, for actuating said door-mounted wave transmitter unit, wherein said door lock assembly is mounted in a first housing portion, said door-mounted wave transmitter unit is mounted in a second housing portion, a slot is provided between said first housing portion and said second housing portion, and said transmitter actuator assembly projects from said first housing portion through said slot into said second housing portion for actuating said door-mounted wave transmitter unit.

2. The apparatus described in claim 1 wherein:

said door-mounted wave transmitter unit transmits waves in a predetermined wave pattern as the door is opened, and said wave receiver assembly of said sound generating unit is positioned so that said wave receiver assembly receives activating wave energy from said door-mounted wave transmitter unit when the door is opened.

3. The apparatus described in claim 1 wherein sound generated by said sound generating unit is music.

4. The apparatus described in claim 1 wherein said door-mounted wave transmitter unit transmits infrared waves, and said sound generating unit is activated upon receipt of activating infrared waves.

5. The apparatus described in claim 4 wherein said activating infrared waves are automatically generated in a coded manner from said door-mounted wave transmitter unit, and wherein said activating infrared waves are automatically decoded in said sound generating unit.

6. The apparatus described in claim 1, further including:

a decoder assembly connected between said wave receiver assembly and said sound generating assembly for automatically decoding coded infrared signals.

7. The apparatus described in claim 1 wherein said door-mounted wave transmitter unit is switched on when a door lock assembly is unlocked.

8. The apparatus described in claim 1 wherein said first housing portion and said second housing portion are formed as a unitary integrated housing structure.

9. A new and improved automatically actuated sound apparatus, comprising:.

a wave transmitter unit mounted on a door, a sound generating unit which includes a wave receiver assembly for receiving wave energy from said door-mounted wave transmitter unit and a sound generating assembly which is activated by said wave receiver assembly, a door lock assembly mounted on the door, and a transmitter actuator assembly, attached to a portion of said door lock assembly, for actuating said door-mounted wave transmitter unit, wherein said door lock assembly is mounted in a first housing portion, said door-mounted wave transmitter unit is mounted in a second housing portion, a slot is provided between said first housing portion and said second housing portion, and said transmitter actuator assembly projects from said first housing portion through said slot into said second housing portion for actuating said door-mounted wave transmitter unit, wherein said door-mounted wave transmitter unit includes a battery power source, an infrared frequency generating assembly powered by said battery power source, and an infrared wave generating assembly driven by said infrared frequency generating assembly.

10. The apparatus described in claim 9, further including:

an indicator light assembly, powered by said battery power source, for indicating when said door-mounted wave transmitter unit is activated.

11. A new and improved automatically actuated sound apparatus, comprising:

a wave transmitter unit mounted on a door, a sound generating unit which includes a wave receiver assembly for receiving wave energy from said door-mounted wave transmitter unit and a-sound generating assembly which is activated by said wave receiver assembly, a door lock assembly mounted on the door, and a transmitter actuator assembly, attached to a portion of said door lock assembly, for actuating said door-mounted wave transmitter unit, wherein said door lock assembly is mounted in a first housing portion, said door-mounted wave transmitter unit is mounted in a second housing portion, a slot is provided between said first housing portion and said second housing portion, and said transmitter actuator assembly projects from said first housing portion through said slot into said second housing portion for actuating said door-mounted wave transmitter unit, wherein said transmitter actuator assembly is operated by a spring bolt in said door lock assembly.

* * * * *